United States Patent [19]

Oak et al.

[11] Patent Number: 4,856,220

[45] Date of Patent: Aug. 15, 1989

[54] RETAINER CAP FOR SPINNING ROD HOLDER

[76] Inventors: Reginald O. Oak, 290 Somerset Ave., Fairfield, Conn. 06430; William J. Preinsberger, P.O. Box 1731, Darien, Conn. 06820

[21] Appl. No.: 292,907

[22] Filed: Jan. 3, 1989

[51] Int. Cl.⁴ .............................................. A01K 97/00
[52] U.S. Cl. ..................................... 43/21.2; 248/314
[58] Field of Search .................. 43/21.2, 25; 248/314, 248/316.1, , 311.2, 538, 530, 532, 533, 535

[56] References Cited

U.S. PATENT DOCUMENTS

| | | | |
|---|---|---|---|
| 2,414,358 | 1/1947 | Calvary | 248/532 |
| 3,290,816 | 12/1966 | Eklof | 43/21.2 |
| 3,516,111 | 6/1970 | Heyman | 248/314 |
| 3,531,888 | 10/1970 | Wells et al. | 43/21.2 |
| 4,748,762 | 6/1988 | Campbell | 43/21.2 |

Primary Examiner—M. Jordan
Attorney, Agent, or Firm—Parmelee, Bollinger & Bramblett

[57] ABSTRACT

A spinning rod retainer cap fits over the mouth of a tubular rod holder to hold the handle and reel of a spinning rod inserted therein. The retainer cap comprises a cylindrical skirt, and a plurality of resilient fingers extending inwardly from the upper end of the skirt, the tips of the fingers defining an entry opening for the handle into the tubular rod holder. Two retainer posts extend upwardly from the skirt adjacent resilient fingers and are spaced apart to define a notch receiving and accommodating the mounting strut of the reel. The resilient fingers incline toward the rod handle to form the notch into a triangular configuration with a narrow entry slot for receiving and restraining the reel strut of the reel.

16 Claims, 2 Drawing Sheets

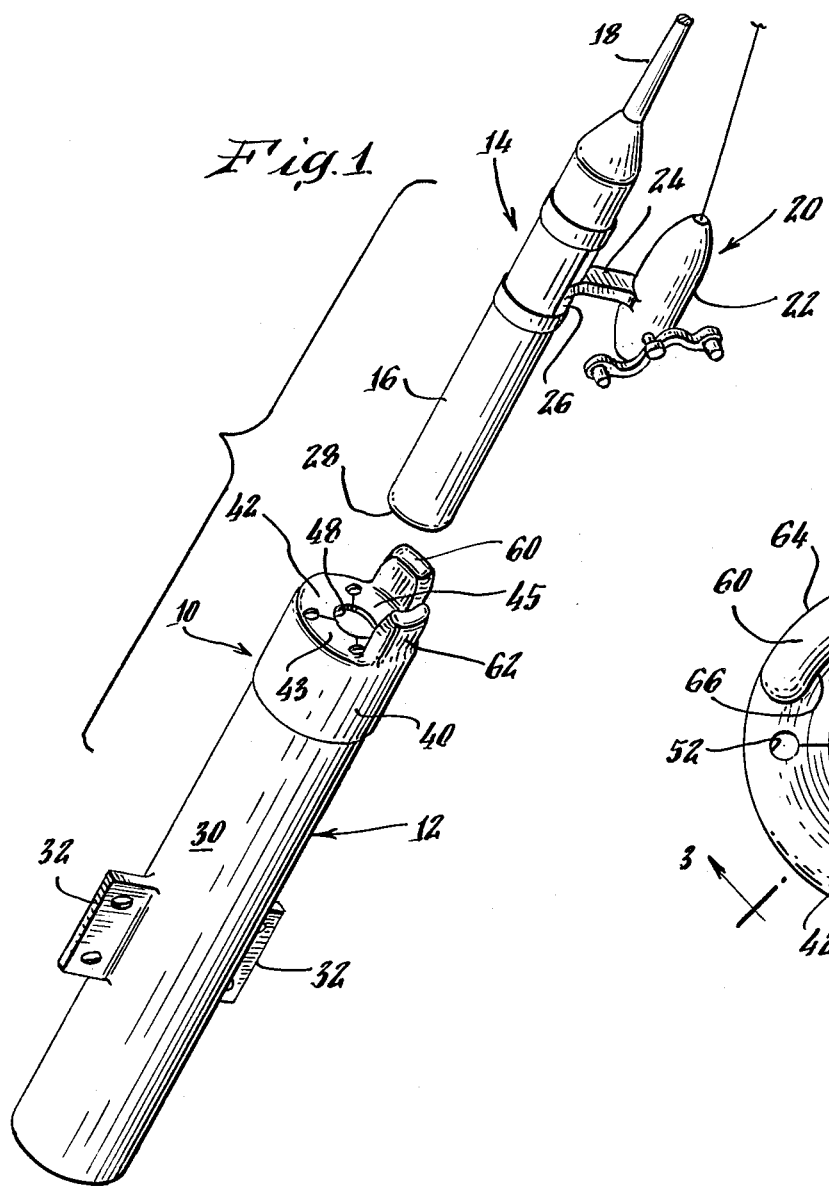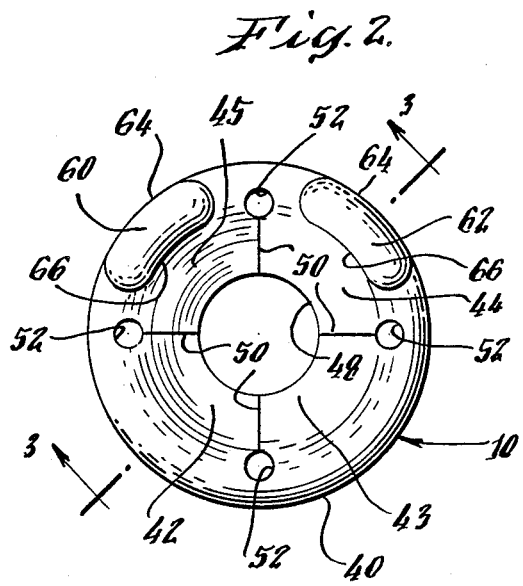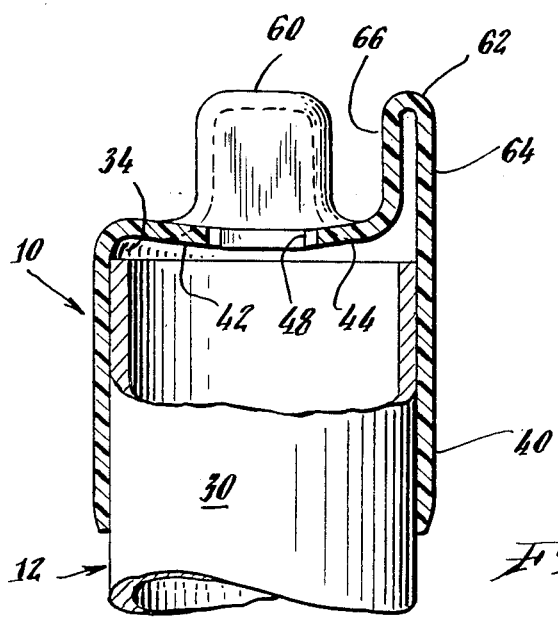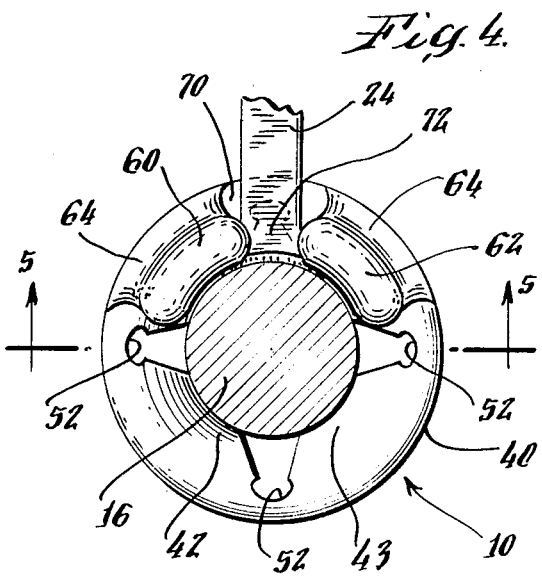

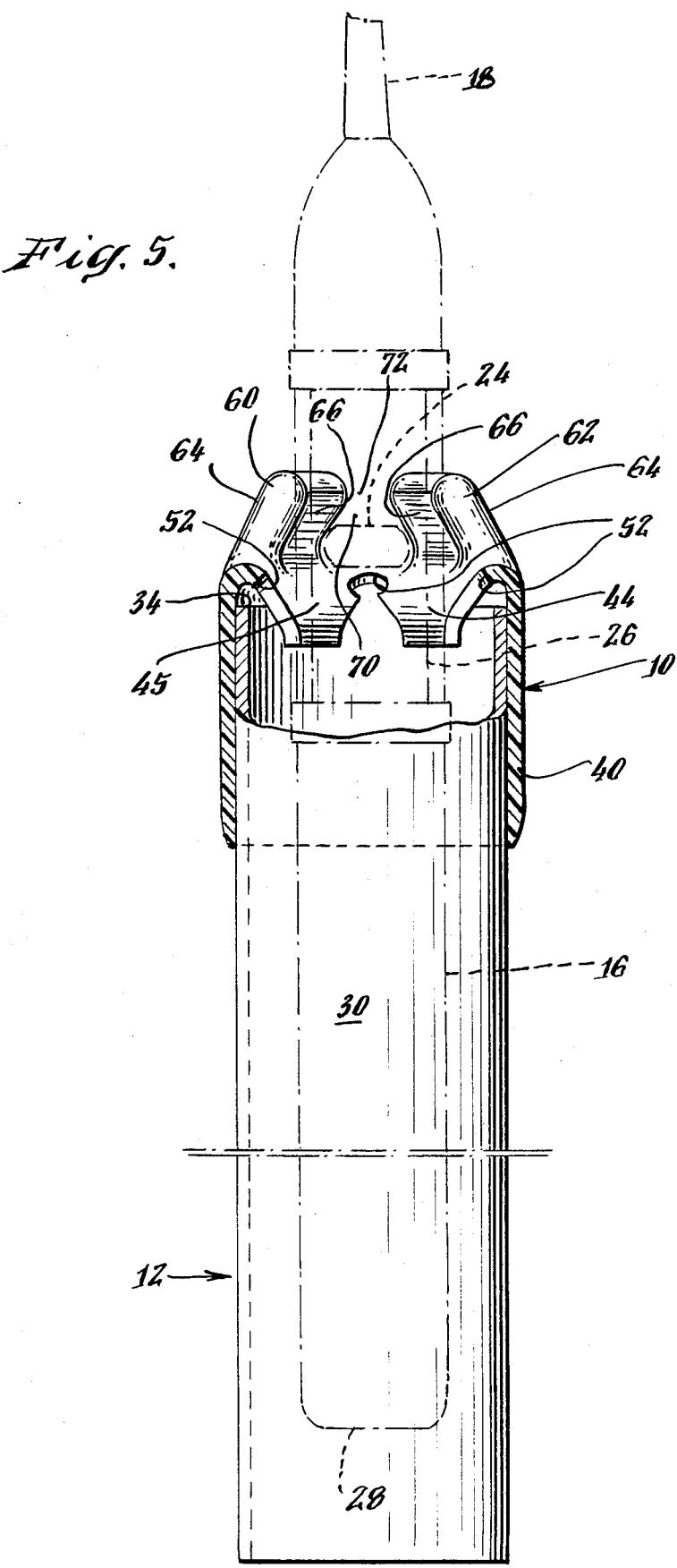

RETAINER CAP FOR SPINNING ROD HOLDER

FIELD OF INVENTION

The invention herein relates to a retainer cap for use with a tubular holder for spinning rods, the retainer cap assisting in retaining and preventing rotation of the spinning rod and reel mounted thereon when the spinning rod and reel are inserted in the retainer cap and rod holder.

BACKGROUND OF INVENTION

It is common for fishermen to transport spinning rods and their reels in rod holders. A spinning rod as referred to herein is the type of fishing rod having a handle and a flexible line guiding portion extending from the handle with a reel mounted spaced apart from the butt end of the handle. The reel is of the type having a mounting base secured to the handle and a strut extending several inches away from the handle to support the body and crank portion of the reel. Thus, there is a substantial portion of the rod handle below the reel, sufficient for the user to grasp and manipulate the rod.

The rod holders in common use are quite simple, comprising a cylindrical tube which may be mounted to either a boat or a land vehicle. The handle end of the rod is inserted into the tube and is loosely accommodated therein. The rod is prevented from going all the way into the tube or through the tube by reason of the reel mounted thereon. The strut of the reel usually butts against the mouth of the rod holder.

Although the rod is held in the tubular rod holder by gravity, it is somewhat free to bounce up or down and it is further free to turn. This becomes a source of damage to the rods and reels, in that the reels are often scratched by the rod holder itself and often bang into each other or to the vehicle on which they are being carried. Fishermen have resorted to self-help solutions to the problem of reel collision. These solutions include cutting a slot in the tubular slot holder to accept the reel strut. This solution is not altogether satisfactory because it is difficult to cut such a slot, especially in aluminum rod holders, and the slot tends to damage the tubular rod holder by making it more prone to crack or break, especially in plastic rod holders. Another self-help solution is to fit a piece of radiator hose over the tubular rod holder and cut a slit in it. The fit, longevity and support of this solution are all limited.

Fishermen's equipment is quite expensive, and a solution to this problem is clearly needed.

SUMMARY OF INVENTION

It is a principal object of the invention herein to improve the transportation of rods in tubular rod holders, and in particular, to better protect rods and the reels mounted thereon during transportation.

It is another object of the invention herein to prevent the turning of rods and reels mounted in tubular rod holders.

It is an additional object of the invention herein to restrain rods from bouncing when mounted in tubular rod holders.

It is a further object of the invention herein to provide a device which is easily mounted to existing tubular rod holders and which substantially improves the function thereof.

The invention herein provides a spinning rod retainer cap for use in combination with a tubular rod holder for receiving and holding a spinning rod having a reel supported on the handle thereof by the reel's integral mounting base and mounting strut. The retainer cap generally comprises a cylindrical skirt sized to fit over and frictionally engage with the tubular rod holder with the upper end of the cylindrical skirt adjacent the mouth of the tubular rod holder. A plurality of flexible fingers extend radially inward from the upper end of the skirt, over the mouth of the tubular rod holder. The tips of the fingers define an entry opening into the tubular rod holder. Two retainer posts are respectfully integrally formed extending upwardly from the skirt and, according to one aspect of the invention, from adjacent flexible fingers, the two retainer posts being spaced apart to form a notch accommodating the mounting strut of the reel.

When the retainer cap is mounted on the tubular rod holder and the handle of the rod is inserted through the entry opening, the fingers deflect inwardly and downwardly to accept and grip the rod handle. As the fingers deflect downwardly, the retainer posts incline toward the handle of the rod, thereby shaping the notch into a triangular configuration with a narrow top entry slot. The strut of the reel passes through the entry slot into the notch and is retained therein, restraining the rod and reel from bouncing or turning movement within the rod holder.

According to another aspect of the invention, the retainer cap is integrally formed of a self-supporting, flexible material, such as plastisol. According to further aspect of the invention, the fingers are formed as slit-apart quadrants of a top panel extending across the mouth of the tubular rod holder and the retainer posts each include an outer wall extending upwardly from the skirt and an inner wall joined with the flexible finger inwardly from the skirt, whereby flexure of the finger inclines the retainer posts.

Other and more specific objects and features of the invention herein will in part be understood by those skilled in the art and will further in part appear from a perusal of the following description of the preferred embodiment and the claims, taken together with the following drawings.

DRAWINGS

FIG. 1 is a perspective view of a retainer cap according to the invention herein mounted on a tubular rod holder and a spinning rod and reel shown positioned for insertion into the retainer cap and tubular rod holder;

FIG. 2 is a top plan view of the retainer cap and tubular rod holder of FIG. 1;

FIG. 3 is a sectional view of the retainer cap and tubular rod holder, taken along the lines 3—3 of FIG. 2;

FIG. 4 is a top plan view of the retainer cap and tubular rod holder of the invention herein, with the spinning rod and reel of FIG. 1 inserted therein and shown in section with the body cut of the reel away;

FIG. 5 is sectional view of the retainer cap and tubular rod holder with the spinning rod and reel inserted therein, taken along the lines 5—5 of FIG. 4.

The same reference numerals refer to the same elements throughout the various Figures.

DESCRIPTION OF PREFERRED EMBODIMENT

A retainer cap 10 according to the invention herein is adapted to be mounted on and operate in combination with a tubular rod holder 12 in receiving and holding a spinning rod and reel 14. The spinning rod and reel 1 includes a flexible rod portion 18 and a handle 16. The handle 16 mounts a reel 20, the reel 20 comprising a body 22 housing the operative mechanism and line, and a strut 24 supporting the body 22 above a mounting base 26 which is secured to the rod handle 16. The reel is mounted spaced apart from the butt end 28 of the rod, so that the handle 16 may be grasped between the reel and the butt end 28.

The tubular rod holder 12 generally comprises a tubular side wall 30 and means for securing the tubular side wall 30 to a boat, pickup truck or the like. The securement means may include mounting ears 32. The tubular side wall 30 defines a mouth 34 at its upper end, as seen in FIGS. 3 and 5. The lower end of the tubular side wall may also be open, to provide drainage.

According to the prior art, the spinning rod 14, including the reel 20, could be stored or carried in the tubular rod holder 12 by merely inserting the handle downwardly through the mouth 34 until the strut 24 abutted against the upper end of the tubular side wall. Although this did serve to support the spinning rod 14 during transportation, the spinning rod tended to bounce and turn, sometimes damaging the reel. When two or more rod holders were mounted adjacent on a vehicle, spinning rods placed therein tended to bang together.

The retainer cap 10 works in combination with the tubular rod holder 12 to better retain and protect the spinning rod 14 carried therein. The retainer cap 10 comprises a cylindrical skirt 40 which fits over the side wall 30 of the tubular rod holder 12 adjacent the upper end thereof, the skirt 40 being sized to fit snugly and frictionally engage the tubular rod holder so that the retainer cap 10 is secured against turning or being pulled off. The retainer cap 10 is preferably fabricated of a material which is resiliently self-supporting, such as plastisol.

The retainer cap 10 further comprises four fingers 42, 43, 44 and 45 which are integrally joined with the upper end of the skirt 40 and extend radially inwardly across the mouth 34 of the tubular rod holder 12. As best seen in FIG. 2, the fingers 42–45 define an entry opening 48 at their distal ends. The fingers 42–45 are separated by slits and the slits terminate in round relief openings 52 near the skirt 40, the relief openings 52 providing some dimensional relief that assists the fingers in their bending action, described below, and protects the material from tearing at the end of the slits 50.

The diameter of the entry opening 48 is selected to work in combination with the size of the spinning rods to be transported. Many spinning rods have handles with diameters in the range of seven-eighths to one and one-quarter inches in diameter, and an entry opening 48 of three-quarters inch diameter is provided to accommodate these common sizes. The inside diameter of the skirt 40 is slightly less than two inches (e.g. 1.950 inches) in the preferred embodiment, whereby the skirt stretches over tubular rod holders having an outside diameter of two inches. The skirt 40 has a length of approximately two inches to grip and be supported by the rod holder. An adhesive may be utilized, as required, to maintain the retainer cap on the rod holder.

The retainer cap 10 further comprises two retainer posts 60 and 62. With particular reference to FIGS. 2 and 3, the retainer post 62 comprises an outside wall 64 extending integrally upwardly from the skirt 40, and an inner wall 66 extending integrally upwardly from the finger 44. The fingers are generally rectangular when viewed in elevation, as in FIG. 3, and the walls 64 and 66 are joined along their side and top edges in smooth continuous curved surfaces. A notch 70 is formed between the retaining posts 60 and 62, the notch 70 being generally U-shaped when the retainer cup is in its relaxed position shown in FIGS. 1–3. The retainer posts are approximately one inch in height above the skirt 40.

FIG. 1 illustrates the handle 16 of the spinning rod 14 in position for being inserted through the entry opening 48 of the retainer cap 10, and FIGS. 4 and 5 illustrate the handle 16 after the insertion has been accomplished. The handle 16 is of greater diameter than the entry opening 48, whereby the fingers 42–45 are resiliently deflected downwardly to provide an enlarged opening accommodating the handle 16. As best seen in FIG. 5, the downwardly deflected fingers grip and retain the handle 16, reducing unwanted up and down bouncing motion.

As the fingers are resiliently deflected downwardly, the retainer posts 60 and 62 incline inwardly toward the rod handle. When the retainer posts are so inclined, the notch 70 defined between the posts takes on a substantially triangular configuration having a narrow entry slot 72 between the adjacent tips of the retainer posts. As the rod handle is pushed downwardly into the tubular rod holder, the reel strut 24 snaps through the entry slot 72 into the notch 70, where it is embraced and retained. The posts 60 and 62 thereby prevent the reel from turning in the tubular rod holder, whereby collision with the reels in adjacent rod holders or with other adjacent vehicle structure is avoided.

Of course, the grip of the retainer cap on the rod handle is insufficient to prevent the rod from being removed for use. The strut 24 is also easily removed from between the retainer posts 60 and 62 as the rod is manually withdrawn from the rod holder 12.

As noted above, the retainer cap 10 is made of a resilient self-supporting material which may be a plastisol material having a durometer in the range of 70 to 76, and preferably 74. The retainer cap is preferably fabricated by applying the plastisol over a mold form which provides a solid panel in the vicinity of the fingers 42–45 and entry opening 48. A die cutting operation is then used to form the slits 50 separating the fingers, the relief openings 52 at the ends of the slit and the entry opening 48.

Accordingly, a retainer cap 10 described above admirably achieves the objects of the invention herein. It should be understood, however, that the retainer cap 10 is merely a preferred embodiment of the invention and that various changes may be made without departing from the spirit and scope of the invention, which is defined in the following claims.

We claim:

1. A spinning rod retainer cap for use in combination with a tubular rod holder for receiving and holding a spinning rod having a reel supported on the handle thereof by the reel's integral base and mounting strut, the retainer cap comprising:

(A) a cylindrical skirt sized to fit over and frictionally engage with the tubular rod holder with the upper end of the skirt adjacent the mouth of the tubular rod holder;

(B) a plurality of resilient fingers extending inwardly from the upper end of the skirt, the tips of the resilient fingers defining an entry opening into the tubular rod holder; and (C) two retainer posts respectively integrally formed extending upwardly from adjacent resilient fingers, the two retainer posts being spaced apart to define a notch for accommodating the mounting strut of the reel;

whereby when the retainer cap is mounted on the rod holder and the handle of the rod is inserted through the entry opening, the resilient fingers deflect downwardly to accept and grip the rod handle and the retainer posts incline toward the rod handle, thereby forming the notch into a triangular configuration which accepts and holds the reel strut.

2. A spinning rod retainer cap as defined in claim 1 wherein the resilient fingers are formed from a panel having slits extending from the entry opening toward the skirt to divide the panel into individual fingers.

3. A spinning rod retainer cap as defined in claim 2 wherein the slits terminate in relief openings.

4. A spinning rod retainer cap as defined in claim 2 wherein the entry opening defined by the tips of the fingers is centrally located with respect to the cylindrical skirt.

5. A spinning rod retainer cap as defined in claim 4 wherein the entry opening has a diameter of approximately three-quarters inch.

6. A spinning rod retainer cap as defined in claim 4 wherein the retainer posts each comprise an outer wall integrally upstanding from the cylindrical skirt and an inner wall integrally joined with the outer wall and with the respective resilient finger for the retainer post.

7. A spinning rod retainer cap as defined in claim 6 wherein the outer and inner walls of the retainer posts are generally rectangular panels joined at their top and side marginal edges in smooth continuous curved surfaces.

8. A spinning rod retainer cap as defined in claim 6 wherein the retainer cap is integrally formed of plastisol.

9. A spinning rod retainer cap as defined in claim 8 wherein the plastisol has a durometer in the range of 70 to 76.

10. A spinning rod retainer cap as defined in claim 1 wherein the tips of the fingers at least partially define an entry opening centrally located with respect to the cylindrical skirt.

11. A spinning rod retainer cap as defined in claim 10 wherein the diameter of the entry opening is approximately three-quarters inch.

12. A spinning rod retainer cap as defined in claim 1 wherein the retainer posts each comprise an outer wall integrally upstanding from the cylindrical skirt and an inner wall integrally joined with the outer wall and with the respective resilient finger for the retainer post.

13. A spinning rod retainer cap as defined in claim 12 wherein the outer and inner walls of the retainer posts are generally rectangular panels joined at their top and side marginal edges in smooth continuous curved surfaces.

14. A spinning rod retainer cap as defined in claim 1 wherein the retainer cap is integrally formed of plastisol.

15. A spinning rod retainer cap as defined in claim 14 wherein the plastisol has a durometer in the range of 70 to 76.

16. A spinning rod retainer cap for use in combination with a tubular rod holder for receiving and holding a spinning rod having a reel supported on the handle thereof by the reel's integral base and mounting strut, the retainer cap comprising:

(A) a cylindrical skirt sized to fit over and frictionally engage with the tubular rod holder with the upper end of the skirt adjacent the mouth of the tubular rod holder;

(B) a plurality of resilient fingers extending inwardly from the upper end of the skirt, the tips of the resilient fingers defining an entry opening into the tubular rod holder wherein the fingers grip a rod handle inserted into the entry opening; and (C) two resilient retainer posts integrally formed extending upwardly from the skirt and fingers, the two retainer posts defining a notch therebetween, the notch having a narrow entry slot permitting entry of the reel strut which is, after entry, restrained in the notch to inhibit bouncing and turning of the spinning rod and reel in the rod holder.

* * * * *